(12) United States Patent
Mulampaka et al.

(10) Patent No.: US 11,444,950 B2
(45) Date of Patent: Sep. 13, 2022

(54) AUTOMATED VERIFICATION OF AUTHENTICATED USERS ACCESSING A PHYSICAL RESOURCE

(71) Applicant: VMware, Inc., Palo Alto, CA (US)

(72) Inventors: Anantha Kalyan Kumar Mulampaka, Alpharetta, GA (US); Thirupati Panyala, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 141 days.

(21) Appl. No.: 16/857,445

(22) Filed: Apr. 24, 2020

(65) Prior Publication Data

US 2021/0336962 A1 Oct. 28, 2021

(51) Int. Cl.
*H04L 29/06* (2006.01)
*H04L 9/40* (2022.01)

(52) U.S. Cl.
CPC ........ *H04L 63/102* (2013.01); *H04L 63/0838* (2013.01); *H04L 63/0853* (2013.01); *H04L 63/0861* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,004,491 B2 * | 8/2011 | Maynard | G06V 30/1423 345/158 |
| 10,733,607 B2 * | 8/2020 | Weiss | G06F 21/35 |
| 10,937,263 B1 * | 3/2021 | Tout | G07C 9/00571 |
| 2003/0110381 A1 * | 6/2003 | Aoshima | H04L 63/0838 713/168 |
| 2006/0071066 A1 * | 4/2006 | Vanzini | G06F 21/34 235/382 |

(Continued)

FOREIGN PATENT DOCUMENTS

| | | | | |
|---|---|---|---|---|
| CN | 103825906 | * | 5/2014 | ............ H04L 29/06 |
| CN | 106708676 | * | 6/2016 | |
| CN | 106209391 | * | 12/2016 | ............ H04L 12/12 |

OTHER PUBLICATIONS

Barrett (Ron Barrett, "ProfileCopy—Move User Profiles easily in Windows", Network World, Mar. 24, 2009 (Year: 2009).*

(Continued)

*Primary Examiner* — Piotr Poltorak
(74) *Attorney, Agent, or Firm* — Thomas | Horstemeyer, LLP

(57) ABSTRACT

Disclosed are examples of a system for automated verification of the identity of a user accessing a physical resource using a client device. The client device can broadcast data to a security device. If the data includes a user credential, the security device can provide the user credential to a verification server to obtain profile information. If the data does not include a user credential, the security device can provide a verification request to the client device. If the user accepts the verification request, the client device can provide a user credential and an identity token to the security device. The security device can provide the user credential to a verification server to obtain profile information. The security device can validate the identity token using the profile information. If the user declines the verification request, the client device can instruct the user to proceed to a verification terminal.

20 Claims, 10 Drawing Sheets

(56) References Cited

U.S. PATENT DOCUMENTS

| | | | | |
|---|---|---|---|---|
| 2011/0093933 | A1* | 4/2011 | Lindholm | H04L 63/205 |
| | | | | 726/5 |
| 2016/0088068 | A1* | 3/2016 | Toy | H04L 63/0272 |
| | | | | 709/219 |
| 2018/0018453 | A1* | 1/2018 | Malpani | G06F 21/34 |
| 2019/0132303 | A1* | 5/2019 | Kurian | H04L 63/08 |
| 2019/0332754 | A1* | 10/2019 | Andersen | G06F 21/35 |
| 2020/0178069 | A1* | 6/2020 | Bushell | H04L 9/3231 |
| 2020/0320188 | A1* | 10/2020 | Graff | G06F 21/45 |
| 2021/0006933 | A1* | 1/2021 | Dean | G16Y 40/10 |
| 2021/0082271 | A1* | 3/2021 | Mars | H04L 63/0861 |
| 2021/0084021 | A1* | 3/2021 | Gibson | H04L 63/10 |

OTHER PUBLICATIONS

Stallings (William Stallings, "Cryptography and Network Security: Principles and Practices (5th Edition)", ISBN-10: 0136097049, 01/10) (Year: 2010).*

* cited by examiner

AUTOMATED VERIFICATION OF AUTHENTICATED USERS ACCESSING A PHYSICAL RESOURCE

BACKGROUND

When a user gains access to a physical resource using a physical access badge, security personnel can challenge the user to show the physical access badge. This allows the security personnel to verify that the user is the owner of the badge by viewing a photograph printed on the physical access badge. In environments where a user gains access to a physical resource using a virtual badge credential provided by a physical access application on a mobile device, security personnel may need to verify that the user is the owner of the mobile device. In these situations, it may be more difficult to verify the user's identity. The security personnel could challenge the user, but the physical access application may not include a photograph of the device's owner. And even if a photograph were available, it is not feasible to physically challenge every user. It would therefore be desirable to automate user identity verification in environments where a user gains access to a physical resource using a virtual badge credential.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
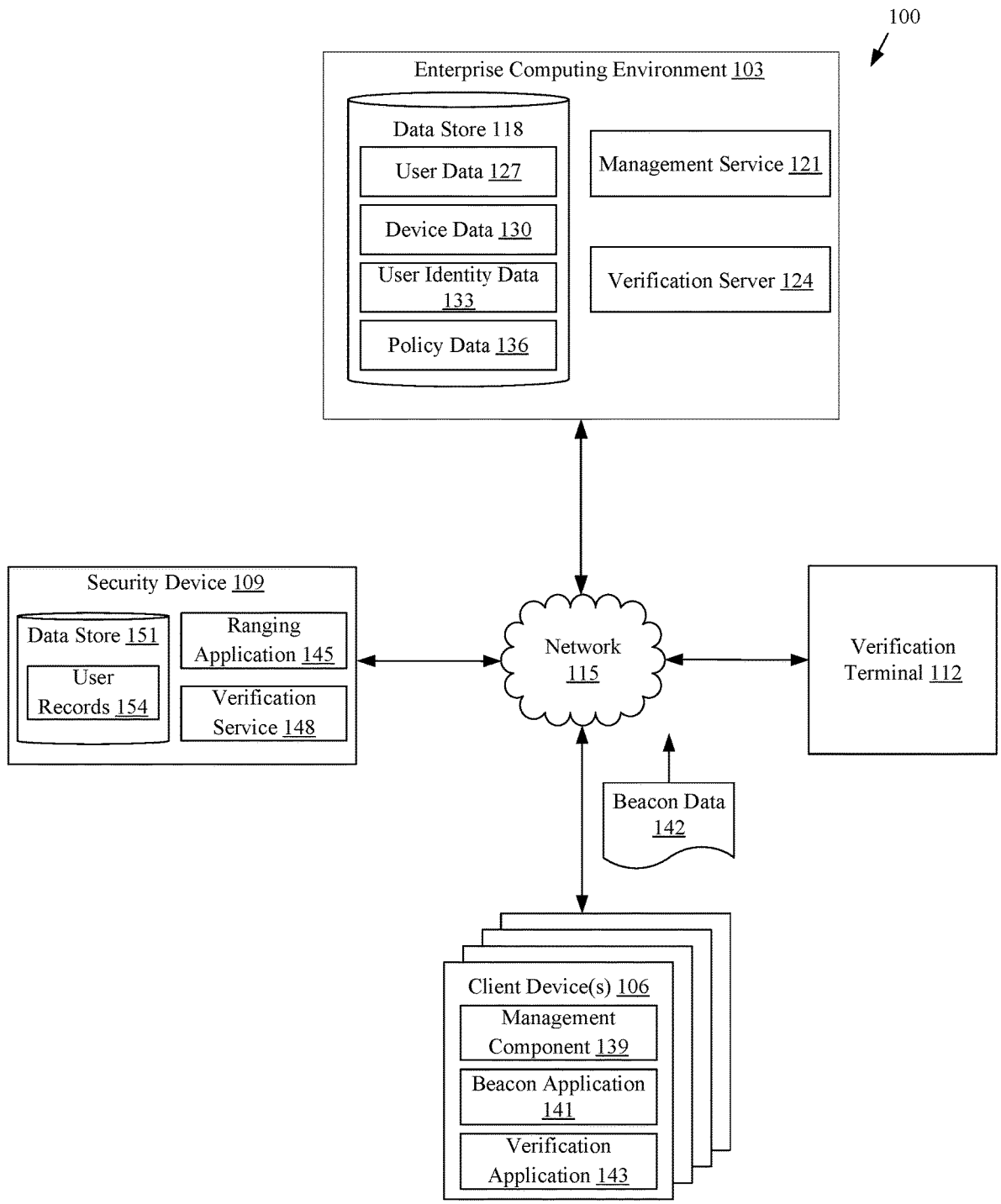
FIG. 1 is a schematic block diagram depicting an example implementation according to various examples of the disclosure.

Disclosed are examples of a system that facilitates automated verification of the identity of a user who, using a mobile or wearable client device, gains access to a physical resource secured by an enterprise. When a user gains access to a physical resource using a client device, security personnel may desire to verify the user's identity. The client device can broadcast data that can be received by a security device operated by the security personnel. If automatic verification has been enabled on the client device, the client device can broadcast an enterprise identifier, which identifies the enterprise with which the user is associated, and a user credential, which identifies the user who owns the client device. If automatic verification has not been enabled on the client device, the client device can broadcast an enterprise identifier but not a user credential.

The security device can scan for client devices broadcasting a particular enterprise identifier associated with the enterprise providing access to the physical resource. When the security device detects a client device broadcasting the particular enterprise identifier, the security device can display a user icon representing the client device on in a display accessible to the security device. A user icon can include the associated user's name and identification image if the user's client device broadcast a user credential. Interacting with this user icon can cause the security device to display the user's profile information. If a user's client device did not broadcast a user credential, the user icon can include an indication that the identity of the user is unknown. Interacting with this user icon can cause the security device to provide a verification request to the client device.

Once the verification request is received, the client device can allow the user to accept or decline the verification request. If the user accepts the verification request, the client device can instruct the user to perform a verification method specified by the verification request. The client device can generate an identity token that includes output data from the verification method and provide the identity token and a user credential to the security device. If the user declines the verification request or fails to respond to the verification request within a period of time after the verification request was received, the verification request can time out. In either case, if the user does not accept the verification request, the client device can instruct the user to proceed to a verification terminal to verify the user's identity. At the verification terminal, the client device can communicate with the verification terminal so that the user is presented with a verification request on a display accessible to the verification terminal. The user can then accept or decline this verification request.

If the security device receives an identity token and a user credential from a client device to which it provided a verification request, the security device can provide the user credential to a verification server to obtain profile information associated with the user. The security device can then validate the identity token using the profile information. The security device can update a user icon displayed in the display to include the user's name, identification image, and other information from the profile information as appropriate.

FIG. 1 illustrates an example of a networked environment 100 according to examples of the disclosure. In the depicted network environment 100, an enterprise computing environment 103 is in communication with at least one client device 106, a security device 109, and a verification terminal 112 over a network 115.

The network 115 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 can include a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 can include multiple computing devices that together can form a hosted computing resource or a grid computing resource. In addition, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 118 that can be accessible to the enterprise computing environment 103. The data store 118 can be representative of a plurality of data stores 118. The data stored in the data store 118 can be associated with the operation of the various applications or functional entities described below.

The components executed on the enterprise computing environment 103 can include a management service 121, a verification server 124, and other applications, services, processes, systems, engines, or functionality not discussed in detail herein.

In some implementations or in certain cases, devices associated with users in a corporate environment can be managed devices that are enrolled with a management service 121. The management service 121 can be executed by the enterprise computing environment 103 in an on-premises implementation or in another computing environment that is separate from the enterprise computing environment 103. The management service 121 can also be provided with access to information about users, user credentials, and physical resources.

The management service 121 can be executed in the enterprise computing environment 103 to monitor and oversee the operation of one or more client devices 106 by administrators. In some examples, the management service 121 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various Application programming interfaces and services that allow client devices 106 to be enrolled as managed devices with the management service 121. The management service 121 can initiate installation of applications as managed applications. The management service 121 can also initiate installation of configuration profiles that can be accessed by certain applications installed on a client device 106.

The management service 121 can include a management console that can allow administrators to manage client devices 106 that are enrolled with the management service 121. User interfaces can allow an administrator to define policies for a user account or client devices 106 associated with an enterprise environment. The user interfaces can also include, for example, presentations of statistics or other information regarding the client devices 106 that can be managed by the management service 121.

The verification server 124 can facilitate verification of a user's identity. The verification server 124 can receive queries for a user's profile information from the security device 109, the verification terminal 112, or other querying entity. Each query can include a user credential. The user credential can be a badge credential, random string, one-time passcode, or other credential that identifies a user. The verification server 124 can access the user identity data 133 and obtain profile information using the user credential. The verification server 124 can then return the profile information to the querying entity.

The data stored in the data store 118 can include user data 127, device data 130, user identity data 133, policy data 136, and potentially other information to support the execution of the management service 121 and the verification server 124. The user data 127 and device data 130 can include the various objects and data structures that are associated with an enterprise directory of user accounts and devices. Objects within the user data 127 and device data 130 can be organized into data structures, such as forests, trees, domains, organizational units, groups, partitions, or other organizational structures depending upon a directory service that might be utilized by the enterprise. Additionally, the directory can be replicated across more than one data store 118 for redundancy purposes. The inner-workings and specific structure of the directory are not shown or discussed herein, as they are not necessary for an understanding of examples of this disclosure. Additionally, the directory of users and devices might be separate from user data that is maintained or utilized by the management service 121. However, the exact configuration of user data and device data is not necessary for a full understanding of examples of the disclosure.

User data 127 can include user identifiers, authentication credentials, other identifying information about users, and information about devices to which users are assigned, such as identifying information about a user's smartphone, wearable devices, or other computing devices that are assigned to or used by the user. The user data 127 can also include session data corresponding to various sessions established by the user. For example, if the user signs into enterprise resources using a first device, a session can be established that corresponds to that first device. If the user then logs in from a second device, another session can be established.

User data 127 can also contain information about users who are associated with client devices 106 that are enrolled with the management service 121. User data 127 can include profile information about a user, authentication information about a user, applications that are installed on client devices 106 associated with the user, and other user information. For example, user data 127 can include information about client devices 106 that are associated with a user account of the user, enterprise resources to which a particular user has access, such as email, calendar data, documents, media, applications, network sites, or other resources. The user data 127 can also identify one or more user groups of which a particular user is a member, which can in turn define the access rights of the user to one or more enterprise resources as well as identify which applications should be deployed to a client device 106 associated with the user. To this end, the user data 127 can further identify one or more device identifiers that can uniquely identify client devices 106 that are associated with a user account of the user. In some implementations, some of the user data 127 can be stored by or in locations specified by the directory service rather than in the data store 118 associated with the management service 121.

Device data 130 can include information about user devices that are being used by the users within the enterprise. Device data 130 can include device identifiers, security certificates, configuration profiles, and other information about devices. Device data 135 can also include information about physical resources that might be secured by the enterprise. In the context of this disclosure, a physical resource can be associated with an electronic record in a directory. A physical resource can correspond to a building, a door, a meeting room, a conference facility, or another physical resource to which the enterprise can secure access. The electronic record associated with the physical resource can specify metadata describing the physical resource. For example, a meeting room name, location, resources within a meeting room, and other metadata can be stored in the electronic record.

Device records in the device data 130 can correspond to client devices 106 that are enrolled as managed devices with the management service 121. A device record can include various security settings selected for enforcement on a client device 106 that is enrolled with the management service 121. Accordingly, a device record can include a device identifier associated with a device, such as the client device 106, one or more device certificates, a compliance status, and other data. In some examples, a device record can also identify a user associated with a particular client device 106. The compliance status can indicate whether a particular client device 106 is in compliance with one or more compliance rules.

More specifically, the device record can include one or more of: data describing the identity, type and components of the client device 106; data describing the state of the client device 106; data describing organizational groups to which the client device 106 belongs; data describing compliance rules with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 121), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 121, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record can include data describing a command queue associated with the client device 106. For example, the management service 121 can maintain a command queue of commands that are designated for execution against the client device 106. As described herein, a client device 106 can be provisioned by the management service 121 by causing resources to be installed or stored on the client device 106. To implement such process, the management service 121 can store a command related to provisioning in the command queue. Additionally, the management service 121 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules with which the client device 106 must comply can, for instance, specify one or more security policies to which the client device 106 must adhere, a compliance status of the client device 106, and one or more remedial actions that should be performed in the event that an associated rule condition occurs, as described later herein. In some embodiments, the data describing compliance rules and the data describing management policies are obtained from an organizational record associated with an organizational group to which the client device 106 is a member (i.e., the compliance rules associated with the organizational group are reflected in the device record of the member client device 106).

A compliance status of a client device 106 represents whether the device is in compliance with one or more compliance rules. Various compliance rules can be enforced on the client device 106 by the management service 121. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be powered off or be in a low power "sleep" state during a specified time period. Another compliance rule can specify that a client device 106 is required to be powered on or be in a normal operation "awake" state during a specified time period. As another example, a compliance rule can specify that a client device 106 is prohibited from rendering content that has been designated as confidential. A compliance rule can also specify whether a camera associated with the client device 106 must be enabled or disabled. The compliance rule can also specify certain times of the day, week, or year in which certain hardware or software features are permitted to be enabled or disabled.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to authenticate a user using a password or personal identification number (PIN) in order to unlock the client device 106.

A compliance rule can also require that the client device 106 has device encryption enabled, where data stored on the device is stored in an encrypted form. The data can be encrypted by a device certificate. A compliance rule can also require that the client device 106 be enrolled with the management service 121 as a managed device. Another compliance rule can specify that the user is required to accept the terms of service that are presented by the management component 139 on the client device 106. As another example, a compliance rule can specify that the management component 139 is required to periodically communicate or "check-in" with the management service 121 to report on its status. If a threshold amount of time has elapsed since the previous check-in of the client device 106, the client device 106 can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

A compliance rule can also identify a list of required applications that must be installed on the client device 106 or a list of forbidden applications that cannot be installed on the client device 106. The management component 139 can remove a forbidden application or install a missing required application on the client device 106 in response to detecting a violation of such a compliance rule. A compliance rule can also require the presence of a mobile device management (MDM) profile, an MDM storage area, an application profile, and/or a configuration profile. The management component 139 can obtain and store missing required data or containers on the client device 106 in response to detecting a violation of such a compliance rule.

Therefore, the compliance status indicates whether and to what extent a particular client device 106 is compliant with compliance rules assigned to the client device 106 by the management service 121. The compliance status can be determined by a management component 139 on the client device 106 that analyzes the status of the client device 106 and reports compliance to the management service 121. In other examples, the compliance status can be determined by the management service 121 based upon state information describing the client device 106, which can be reported by the management component 139. The compliance status can also include the state of various hardware or software features of the client device 106 without respect to whether the status of the features are determined by a compliance rule.

The user identity data 133 can represent data that can be used to identify users' identities. For example, the user identity data 133 can include user credentials that are issued to users for the purpose of accessing physical resources secured by an enterprise, such as rooms or buildings. As another example, the user identity data 133 can include profile information about users, including users' names, identification images, contact information, and other user-identifying information. The user identity data 133 can also include, for instance, biometric data that represents data created as a result of a user's performance of one or more biometric authentication processes. The user identity data 133 can be stored in encrypted form and/or indexed in various ways. In some implementations, the user identity data 133 for a user can be accessed using a user credential associated with that user. The verification server 124 can act as the portal through which the user identity data 133 is manipulated by an administrator or queried by the security device 109 or the verification terminal 112.

The policy data 136 can represent data comprising policies configured by the enterprise. The policy data 136 can indicate methods by which a user's identity can be verified. The policy data 136 can be configured by the enterprise according to the enterprise's own needs and the needs of the physical resource to which the enterprise is providing access. The policy data 136 can be stored in encrypted form and/or indexed in various ways. The verification server 124 can act as the portal through which the policy data 136 is manipulated by an administrator or queried by the security device 109. the verification terminal 112, or other querying device. While the policy data 136 is shown in the data store 118 of the enterprise computing environment 103, the policy data can also be transmitted to the security device 109 and stored in the data store 151. When an administrator modifies the policy data 136, the modified policy data 136 can be transmitted to the security device for storage in the data store 151.

The policy data 136 can include data that defines one or more verification methods that can be used to facilitate verification of a user's identity. For example, the policy data 136 can define a verification method in which an identity token that includes basic biographical information about a user is generated by the client device 106 and validated by the verification service 148. As another example, the policy data 136 can define a verification method in which a user performs a biometric authentication process, such as voice identification, fingerprint scanning, retinal scanning, facial recognition, or any other biometric authentication method desired by the enterprise. In some implementations, the policy data 136 can indicate that a user should perform more than one verification method.

The policy data 136 can indicate which verification method a user should perform in a given situation. In some implementations, the robustness of the verification method can depend on the level of security that the enterprise implements for the physical resource. As an example example, for a low-security physical resource, the policy data 136 could indicate that a user should enter an unlock pattern or a personal identification number on the user's client device 106. As another example, for a high-security physical resource, the policy data 136 could indicate that a user should perform biometric authentication or even multiple verification methods on the user's client device 106. Of course, which verification method is used in a given situation can be configured by an administrator and reflected in the policy data 136.

In some implementations, the policy data 136 can indicate that the verification method used depends on a user's appearance or behavior. If a user exhibits an unusual appearance or behavior, the policy data 136 can indicate that the user should perform a more robust verification method like biometric authentication or perform multiple verification methods. As an example, if a user's face is obstructed, the policy data 136 could indicate that the user should perform face authentication. As another example, if an issue with the user's voice is detected, the policy data 136 could indicate that the user should perform voice authentication. Which verification method is used can also depend on any other condition or circumstance according to the policy data 136.

These verification methods may employ the client device's 106 integrated security mechanisms. So if a client device 106 does not support a verification method, the user will be unable to perform the verification method indicated by the policy data 136. For example, the policy data 136 can indicate that a user should perform fingerprint authentication. But if the user's client device is not capable of providing fingerprint authentication, the user will be unable to perform the verification method indicated by the policy data 136. In that case, then the client device 106 can display a user interface element that instructs the user to proceed to the verification terminal 112.

The client device 106 can represent multiple client devices 106 coupled to the network 115. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 121 as a managed device of the enterprise. In some implementations, the client device 106 can be an unmanaged device that is not enrolled with a management service 121.

In one implementation, the client device 106 can execute a management component 139 that can communicate with the management service 121 to facilitate management of the client device 106. The management component 139 can communicate with the management service 121 to enforce management policies and compliance rules on the client device 106. For example, the management component 139 can enforce data security requirements, install, remove or update security certificates, or write, modify or delete certain data from the client device 106. The management component 139 can also monitor the client device 106, generate state information describing the client device 106, and provide the management service 121 with such state information. For example, the state information can include the network activity of the client device 106, the location of the client device 106, whether enforce password or personal identification number (PIN) authentication is enforced, and/or whether other compliance rules are being complied with by the client device 106. In one example, the state information can be generated by the management component 139 by receiving compliance rules from the management service 121 over the network 115, comparing the state of the client device 106 to the compliance rules, and determining whether the client device 106 fails to satisfy the compliance rules.

To carry out local management of a client device 106, the management component 139 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can also execute a beacon application 141 that can cause the client device 106 to communicate with the security device 109 to provide beacon data 142 to the security device 109. The beacon application 141 can be configured to automatically launch when in the proximity of the security device 109 or the verification terminal 112 through a wireless communication session. The beacon application 141 can cause the client device 106 to begin broadcasting beacon data 142 once the client device 106 is within a configurable range of the security device 109. The configurable range can be based on a signal strength threshold that can be adjusted by the user or by an administrator.

The beacon data 142 can include an enterprise identifier and a user credential field. The enterprise identifier can correspond to an enterprise with which a user is associated. The enterprise identifier can be assigned to the user by an administrator and stored on the client device 106. In some implementations, the enterprise identifier can expire following a predetermined period of time configured by a user or an administrator, and the user account can be assigned a new enterprise identifier.

When launched, the beacon application 141 can access the enterprise identifier stored on the client device 106 and determine what value to include in the user credential field of the beacon data 142. What value the beacon application 141 includes in the user credential field can depend on an automatic verification setting stored on the client device 106. If the automatic verification setting indicates that automatic verification is enabled for the client device 106, the beacon application 141 can include a user credential in the user credential field of the beacon data 142. If the automatic verification setting does not indicate that automatic verification is enabled for the client device 106, the beacon application 141 can include a null value or some other placeholder value in the user credential field of the beacon data 142. The automatic verification setting can be adjusted by a user or by an administrator. In some implementations, the automatic verification setting can be adjusted to enable automatic verification when the client device 106 responds to a verification request from the security device 109.

The beacon application 141 can generate the beacon data 142 using the enterprise identifier and the value to be included in the user credential field. In some implementations, if a user credential is included in the user credential field, the user credential can be encrypted using a public key corresponding to a private key held by the security device 109. The beacon application 141 can then cause the client device 106 to broadcast the beacon data 142 using Bluetooth Low Energy, Bluetooth, near-field communication, radio-frequency identification, or other wireless or wired communication protocols supported by the client device 106 and the security device 109. In some implementations, the beacon application 141 can cause the client device 106 to function as a Bluetooth Low Energy beacon using iBeacon, AltBeacon, Eddystone, or other Bluetooth Low Energy beacon protocol.

The client device 106 can also execute a verification application 143 that can facilitate verification of a user's identity by responding to verification requests. The verification application 143 can receive verification requests from the security device 109. A verification request can specify one or more verification methods that the user should perform to facilitate verification of the user's identity. Upon receiving a verification request, the verification application 143 can cause a prompt or other user interface element to be displayed in a display accessible to the client device 106. The prompt or other user interface element can allow a user of the client device 106 to accept or decline the verification request.

If the user accepts the verification request, the verification application 143 can cause another prompt or other user interface element to be displayed that instructs the user to perform the verification method specified by the verification request. The verification application 143 can then invoke the verification method specified by the verification request using Application programming interfaces provided by the manufacturer of the client device 106, if any. If, however, the verification method is not supported by the client device 106, the verification application 143 can display a user interface element that instructs the user to proceed to the verification terminal 112.

Using output data returned from the verification method, the verification application 143 can generate an identity token that can be used to facilitate verification of the user's identity. The output data can include one or more Boolean values that indicate the success or failure of the user's performance of the verification method, biometric authentication data collected from the user by the client device 106, or any other data generated or collected by the client device 106 as a result of the user's performance of the verification method. The verification application 143 can cause the client device 106 to provide the identity token and a user credential to the verification service 148 using Bluetooth Low Energy, Bluetooth, near-field communication, or other wireless or wired communication protocols supported by the client device 106 and the security device 109. The user credential can be a badge credential, a single-use passcode, or a randomly-generated string.

If the user declines the verification request—or if the user fails to respond to the verification request within a predetermined period of time after the verification request was received—the verification application 143 can display a user interface element that instructs the user to proceed to the verification terminal 112. In some implementations, the verification application 143 can also provide an indication that the verification request was not accepted to the verification service 148.

The security device 109 can represent a computing device used to detect client devices 106 proximate to a physical resource secured by an enterprise and to facilitate verification of the identities of the users of those client devices 106. The security device 109 can be a computing device owned by security personnel or other user or issued to the security personnel or other user by the enterprise. The security device 109 can verify—automatically or on request—the identities of users of client devices 106 detected by the security device 109. The security device 109 need not be operated by security personnel or other user, though, and the security device 109 can perform the functions described herein without user input or interaction.

The security device 109 can execute a ranging application 145. The ranging application 145 can communicate with client devices 106 or other devices broadcasting beacon data 142 using Bluetooth Low Energy, Bluetooth, near-field communication, radio-frequency identification, or other wireless or wired communication protocols supported by the client device 106 and the security device 109. The ranging application 145 can cause the security device 109 to scan for client devices 106 that are broadcasting beacon data 142 within a predefined radius. Once the ranging application 145 receives beacon data 142 from a client device 106, the ranging application 145 can parse the beacon data 142 to identify an enterprise identifier. The ranging application 145 can create a user record 154 corresponding to the client device 106, include the enterprise identifier in the user record 154, and store the user record 154 in the data store 151. The user records 154 can include data associated with users and those users' respective client devices 106, including, for example, enterprise identifiers, user credentials, profile information, or other user-identifying information.

The ranging application 145 can determine from an enterprise identifier whether a client device 106 is associated with the same enterprise as the security device 109. In some implementations, if an enterprise identifier does not correspond to the enterprise, the ranging application 145 can update the associated user record 154 in the data store 151 to include an indication that the client device 106 is not associated with the enterprise. In other implementations, the ranging application 145 can take no action upon determining that an enterprise identifier does not correspond to the enterprise.

If the enterprise identifier indicates that the client device 106 is associated with the enterprise, the ranging application 145 can check the user credential field in the beacon data 142 to determine whether it includes a user credential. In some cases, the user credential field may contain a user credential that identifies a user of the client device 106. In other cases, the user credential field can contain a null value or some other placeholder value indicating that the user credential field does not contain a user credential. The security device 109 can be flashed by the manufacturer with a decryption key with which user credentials can be decrypted. The decryption key can be a private key that corresponds to a public key with which a user credential is encrypted by or on behalf of the device providing a user credential to the security device 109.

If there is a user credential present in the user credential field, the ranging application 145 can extract the user credential from the beacon data 142. The ranging application 145 can decrypt the user credential using the decryption key if the user credential is encrypted. The ranging application 145 can then update the associated user record 154 in the data store 151 to include the user credential. If there is no user credential present in the user credential field, the ranging application 145 can update the user record 154 the data store 151 to include an indication that the identity of the user is unknown.

The ranging application 145 can also display in a display accessible by the security device 109 a representation of the estimated physical proximities of the detected client devices 106 relative to the physical resource and the client devices 106. The physical proximity of a client device can be estimated based on the strength of a signal broadcast by the client device 106. The ranging application 145 represent the client devices 106 detected by the ranging application 145 using user icons that include data from the corresponding user record 154. A user icon can include information about a user obtained from the corresponding user record 154. If an enterprise identifier stored in a user record 154 indicates that the corresponding user is not associated with the enterprise, the ranging application 145 can generate a user icon that includes an indication that the user is not associated with the enterprise. Otherwise, if a user record 154 includes the user's profile information, the ranging application 145 can generate a user icon using at least a portion of the profile information. For example, a user icon can include user-identifying information like, for example, the user's name and identification image. And once a user's identity has been verified, the user icon can include an indication that the user has been verified.

If, however, a user record 154 does not include the corresponding user's profile information, the ranging application 145 can check the user record 154 for a user credential. If the user record 154 includes a user credential but no profile information, the ranging application 145 can request profile information for the user associated with that user credential from the verification service 148. When profile information is received from the verification service 148, the ranging application 145 can then use at least a portion of that profile information to generate the user icon. In some implementations, the ranging application can also store the profile information in the corresponding user record 154.

If a user record 154 includes neither profile information nor a user credential, the ranging application 145 can generate a user icon that includes and indication that the user's identity is unknown. For example, the user icon can include a placeholder such as the word "Unknown" in place of a name and a default image in place of an identification image.

Once a user icon has been generated, if the ranging application 145 receives an input corresponding to the user icon, the ranging application 145 can access the corresponding user record 154 in the data store 151. If the user record 154 includes an enterprise identifier indicating that the user is not associated with the enterprise, the ranging application 145 can take no further action. Otherwise, if the enterprise identifier indicates that the user is associated with the enterprise, the ranging application 145 can display a user profile in a display accessible to the security device 109. A user profile can include at least a portion of a user's profile information including, for example, the user's name, identification image, contact information, and badge credential. If a user record 154 does not include the user's profile information, the ranging application 145 can first request the profile information from the verification service 148 and then display a user profile.

The security device 109 can also execute a verification service 148 that can facilitate verification of the identity of a user of a client device 106 associated with the enterprise by providing verification requests to client devices 106 and obtaining profile information from the verification server 124. The verification service 148 can receive a request to obtain profile information about a user from the ranging application 145. In some implementations, the request from the ranging application 145 can include a user credential. In other implementations, the verification service 148 can check the user record 154 associated with that user for a user credential. If the user record 154 or the request from the ranging application 145 includes a user credential, the verification service 148 can query the verification server 124 with the user credential over the network 115. The verification service 148 can receive the user's profile information from the verification server 124 in return. The verification service 148 can then store the user's profile information in the corresponding user record 154. In some implementations, the verification service 148 can also provide the profile information to the ranging application 145.

If neither the user record 154 nor the request from the ranging application 145 includes a user credential, the verification service 148 can provide a verification request to the client device 106 associated with that user. The verification request can be provided to the client device 106 using Bluetooth Low Energy, Bluetooth, near-field communication, or other wireless or wired communication protocols supported by the client device 106 and the security device 109. The verification request can specify one or more verification methods that the user can perform in response to the verification request. The verification service 148 can determine which verification method is specified by the verification request based on the policy data 136. For example, the policy data 136 can indicate which verification method the verification request can specify according to the characteristics of the physical resource, the appearance or behavior of the user, or any other condition or circumstance configured by an administrator and reflected in the policy data 136.

In some implementations, before providing the verification request to the client device 106, the verification service 148 can display a prompt or other user interface element in a display accessible to the security device 109. The prompt or other user interface element can include text that instructs security personnel or other user to choose whether to provide a verification request to the client device 106. The prompt or other user interface element can also include a selectable component that can cause the verification service 148 to provide a verification request to the client device 106 and a selectable component that can cause the verification service 148 to refrain from providing a verification request to the client device 106.

The verification service 148 can receive a response to a verification request from a client device 106. For example, the verification service 148 can receive an identity token and a user credential from the client device 106. Or, alternatively, the verification service 148 can receive an indication that the user has not accepted the verification request from the client device 106. If no response to the verification request is received within a predetermined period of time after the verification request is provided to the client device 106, the verification request can time out. If the verification request times out, the verification service 148 can provide another verification request to the client device 106, display in a display accessible to the security device 109 an indication that the verification request has timed out, take any other appropriate action, or take no action at all.

The verification service 148 can validate the identity token that was received from the client device 106. The identity token can include output data returned from a verification method performed by the user of the client device 106. In some implementations, the verification service 148 can validate the identity token by determining whether the identity token indicates that the verification method was successful. In other implementations, the verification application 143 can validate the identity token by determining whether the output data matches the profile information received from the verification server 124. For example, the verification service 148 can check biometric authentication data returned from the verification method against biometric data and included with the profile information received from the verification server 124. If the identity token was received from the verification application 143 in an encrypted form, the verification service 148 can, before validating the identity token, decrypt the identity token using a private key corresponding to a public key that was used to encrypt the identity token.

In some implementations, if the verification service 148 determines that the identity token is not valid, the verification service 148 can display a prompt or other user interface element in a display accessible to the security device 109 that alerts security personnel or other user that the user's identity was not successfully verified. And in some implementations, if the verification service 148 determines that the identity token is valid, the verification service 148 can store an indication that the user's identity has been verified in the corresponding user record 154.

The verification terminal 112 can represent a computing device can be used to verify the user's identity if the user declines a verification request. In some implementations, the verification terminal 112 can also perform some or all of the functions of the security device 109 described herein and be used in addition to or in place of the security device 109.

The verification terminal 112 can be in communication with the enterprise computing environment 103 and potentially the security device 109 over the network 115. The verification terminal 112 can communicate with a client device 106 or other device using Bluetooth Low Energy, Bluetooth, near-field communication, radio-frequency identification, or other wireless or wired communication protocols supported by the client device 106 and the security device 109. The verification terminal 112 can also capture a credential from a client device 106, badge, proximity card, radio-frequency identification device, or other device that communicates using a standard supported by the verification terminal 112. The verification terminal 112 can be flashed by the manufacturer with a decryption key with which user credentials can be decrypted. The decryption key can be a private key that corresponds to a public key with which a user credential is encrypted by or on behalf of the device providing a user credential to the verification terminal 112.

In some implementations, when a client device 106 is brought into proximity of the verification terminal 112, the verification terminal 112 can provide a verification request to the client device 106. The verification request can include a request that the client device 106 provide a user credential for a user account associated with the client device. In other implementations, the verification terminal 112 can display in a display accessible to the verification terminal 112 a prompt or other user interface element that allows a user to verify the user's identity or decline to verify the user's identity. In either case, the verification terminal 112 can then obtain a user credential from the client device 106.

The verification terminal 112 can query the verification server 124 over the network 115 with the user credential obtained from the client device 106. In return, the verification server 124 can provide to the verification terminal 112 profile information about the user associated with that user credential. This profile information can then be used to facilitate verification of the user's identity. In some implementations, a user profile including at least a portion of the profile information can be displayed in a display accessible to the verification terminal 112. The user profile can include, for example, a user's name, identification image, contact information, and badge credential.

Figure 2:
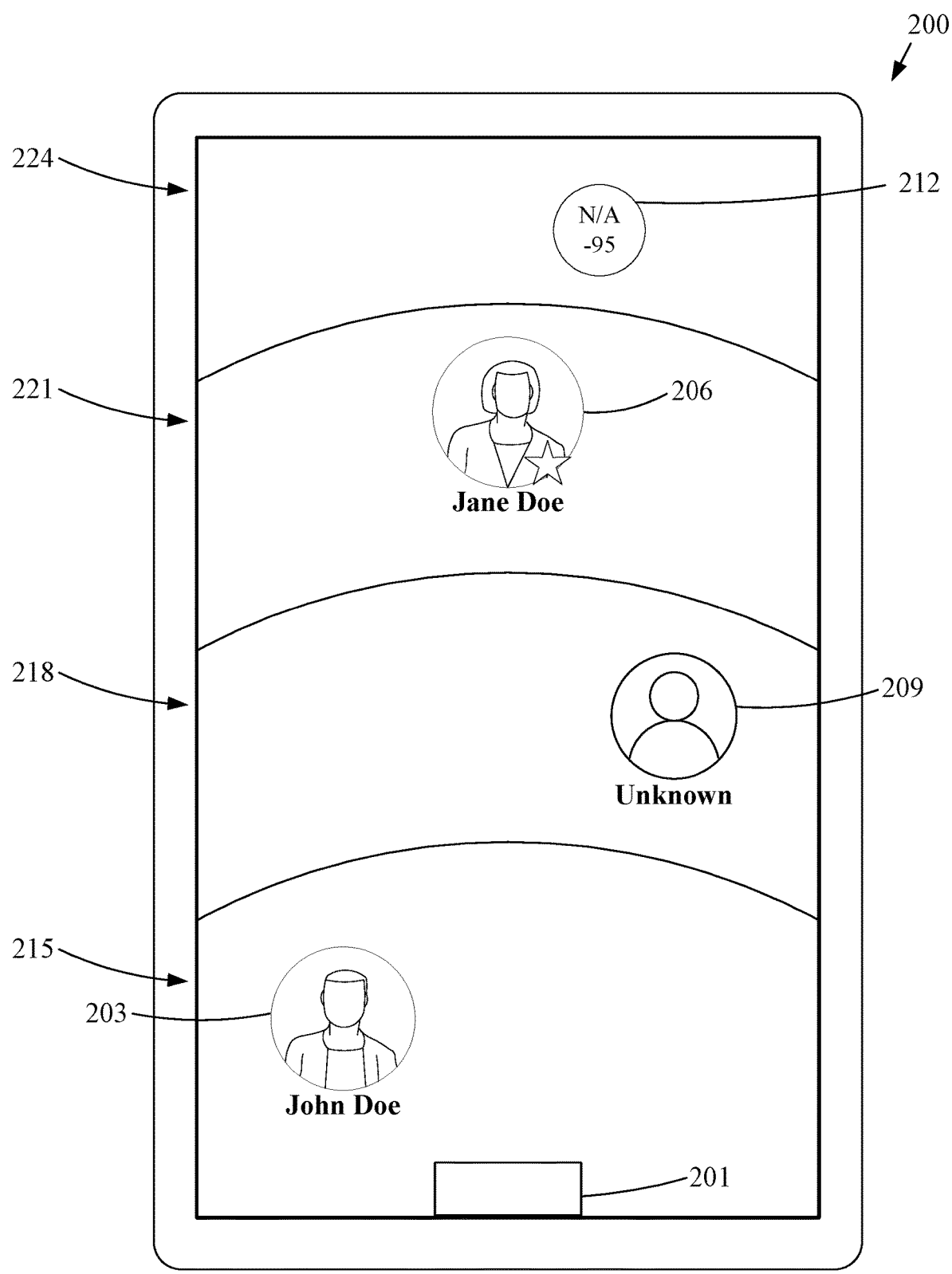
FIG. 2 is an example of a ranging application executed by a security device according to examples of the disclosure.

Referring next to FIG. 2, shown is an example of a ranging application 145 executed by the security device 109. The ranging application that can display in a display accessible to the security device 109 a map interface 200 that depicts the client devices 106 detected by the ranging application 145. The map interface 200 can show an estimated physical proximity of each client device 106 to the security device 109 and other client devices 106. Each client device 106 can be represented on the map interface 200 by a user icon.

The map interface 200 shown in FIG. 2 includes a known user icon 203, a verified user icon 206, an unknown user icon 209, and an unassociated user icon 212. The known user icon 203 represents a client device 106 with automatic verification enabled that is associated with a user whose identity has not been verified. The known user icon 203 includes the user's name and identification image from the corresponding user record 154. The verified user icon 206 represents a client device 106 associated with a user whose identity has been verified. The verified user icon 206 includes the user's name and identification image from the corresponding user record 154, along with an indication that that the user has been verified. The unknown user icon 209 represents a client device 106 without automatic verification enabled that is associated with a user whose identity has not been verified. The unknown user icon 209 includes an indication that the user's identity is unknown. The unassociated user icon 212 represents a client device 106 that is not associated with the enterprise providing access to the physical resource.

The ranging point 201 can represent the location of a physical resource to which the enterprise is providing access. The signal strength from each client device 106 broadcasting beacon data 142 can be used to estimate its proximity to the ranging point 201. For example, the ranging application 145 could estimate that a client device 106 broadcasting beacon data 142 with a high-strength signal is in close proximity to the ranging point 201. On the other hand, the ranging application 145 could estimate that a client device 106 broadcasting beacon data 142 with a weak-strength signal is in far proximity to the ranging point 201. And in some cases, a client device's 106 may be broadcasting beacon data 142 with a signal strength that is so weak that the ranging application cannot reliably estimate its proximity to the ranging point 201.

The map interface 200 is divided into proximity zones 215-224 that illustrate the proximity of client devices 106 to a ranging point 201. The proximity zones 215-224 include an immediate proximity zone 215, a near proximity zone 218, a far proximity zone 221, and an inestimable proximity zone 224. Each proximity zone 215-224 includes client devices 106 broadcasting beacon data 142 at a range of signal strengths. Thus, each proximity zone 215-224 includes client devices 106 in a range of estimated proximities from the ranging point 201. The range of signal strengths for each proximity zone 215-224 can be defined by an administrator.

A client device 106 broadcasting a high-strength signal compared to other client devices 106 can be located in the immediate proximity zone 215 on the map interface 200. Thus, the client device 106 associated with the known user icon 203 can be in a closer estimated proximity to the ranging point 201 than client devices 106 located in the near proximity zone 218 and the far proximity zone 221.

A client device 106 broadcasting a medium-strength signal can be located in the near proximity zone 218 on the map interface. Thus, the client device 106 associated with the unknown user icon 209 can be in a closer estimated proximity to the ranging point 201 than client devices 106 in the far proximity zone 221 but further than those in the immediate proximity zone 215.

A client device 106 broadcasting a weak-strength signal can be located in the far proximity zone 221 on the map interface 200. Thus, the client device 106 associated with the verified user icon 206 can be in a further estimated proximity than client devices 106 in the immediate proximity zone 215 and the near proximity zone 218.

A client device 106 with broadcasting a signal so weak that its proximity cannot be estimated can be located in the inestimable proximity zone 224 on the map interface 200. Thus, the client device 106 associated with the unassociated user icon 212, can have an unknown proximity from the ranging point 201.

If the ranging application 145 receives an input corresponding to the known user icon 203 or the verified user icon 206, the ranging application 145 can cause the client device 106 to display a user profile for the corresponding user in a display accessible to the security device 109. The user profile can include, for example, a user's name, identification image, contact information, and badge credential.

If the ranging application 145 receives an input corresponding to the unknown user icon 209, the ranging application 145 can request the profile information from the verification service 148. When the ranging application 145 receives profile information from the verification service 148, the ranging application 145 can store the profile information in the corresponding user record 154 and include at least a portion of the profile information in the corresponding user icon displayed on the map interface 200. In some implementations, the ranging application 145 can then display a user profile for that user in a display accessible to the security device 109.

Figure 3A:
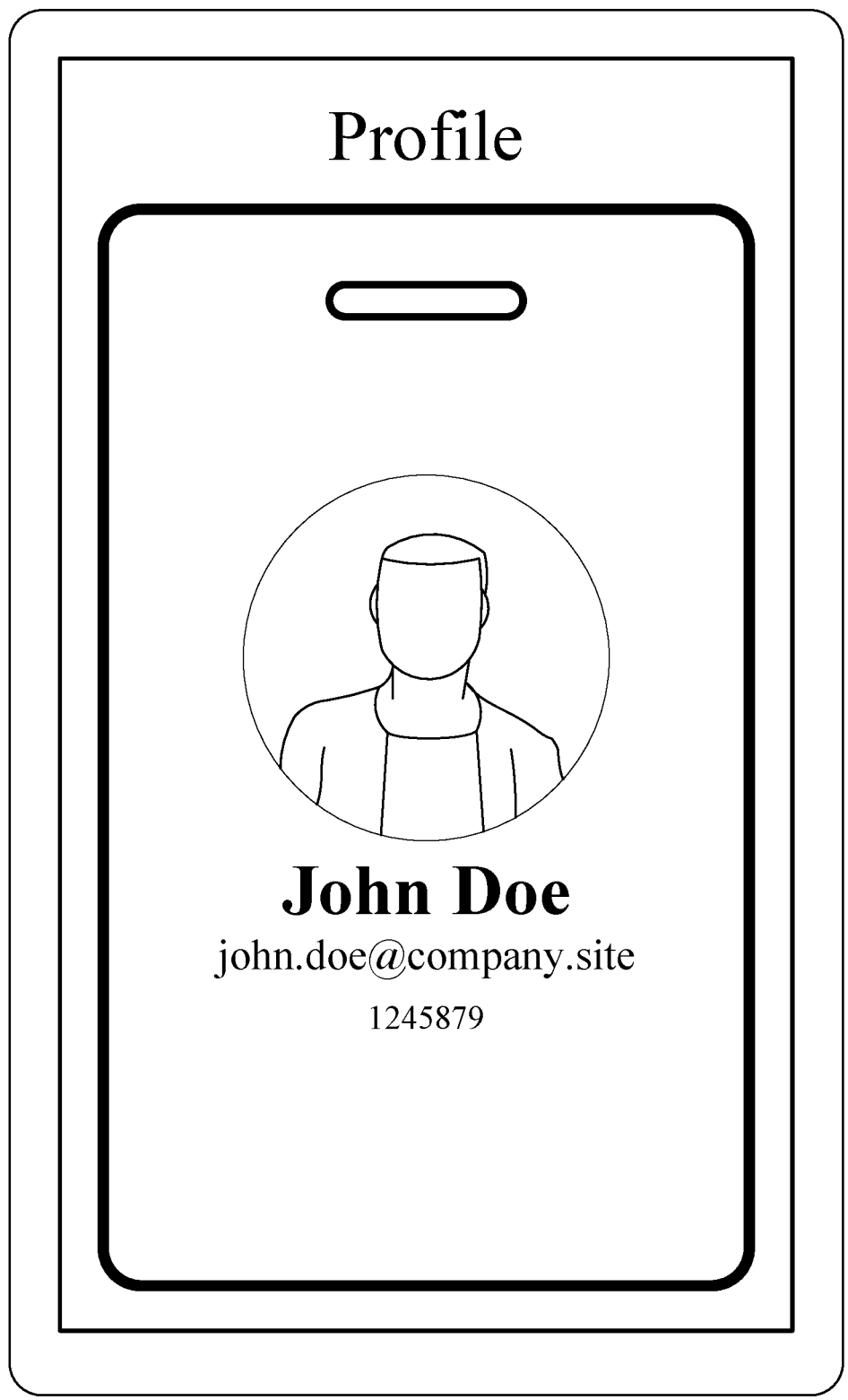
FIGS. 3A-3B are examples of a ranging application executed by a security device according to examples of the disclosure.
Figure 3B:
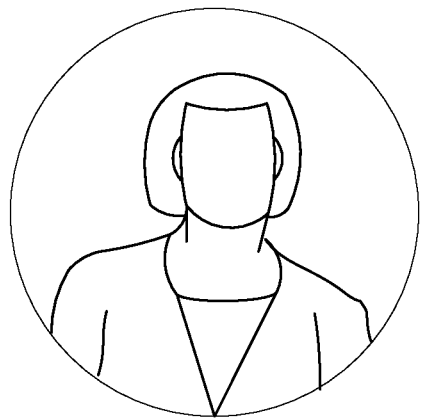

Referring next to FIGS. 3A-3B, shown are examples of the ranging application 145 executed by the security device 109. In these examples, the verification service 148 displays user profiles that include profile information from the user records 154 for two different users. The profile information included in the user profiles includes the user's name, identification image, contact information, and badge credential. The verification service 148 can display a user profile following a user interaction with the corresponding user icon on the map interface 200. In FIG. 3A, the ranging application 145 displays a user profile that includes profile information from the user record 154 for the user corresponding to the known user icon 203. The user profile in FIG. 3A can be displayed following a user interaction with the known user icon 203 on the map interface 200. In FIG. 3B, the ranging application 145 displays a user profile that includes profile information from the user record 154 for the user corresponding to the verified user icon 206. The user profile in FIG. 3B can be displayed following a user interaction with the verified user icon 206 on the map interface 200.

Figure 4:
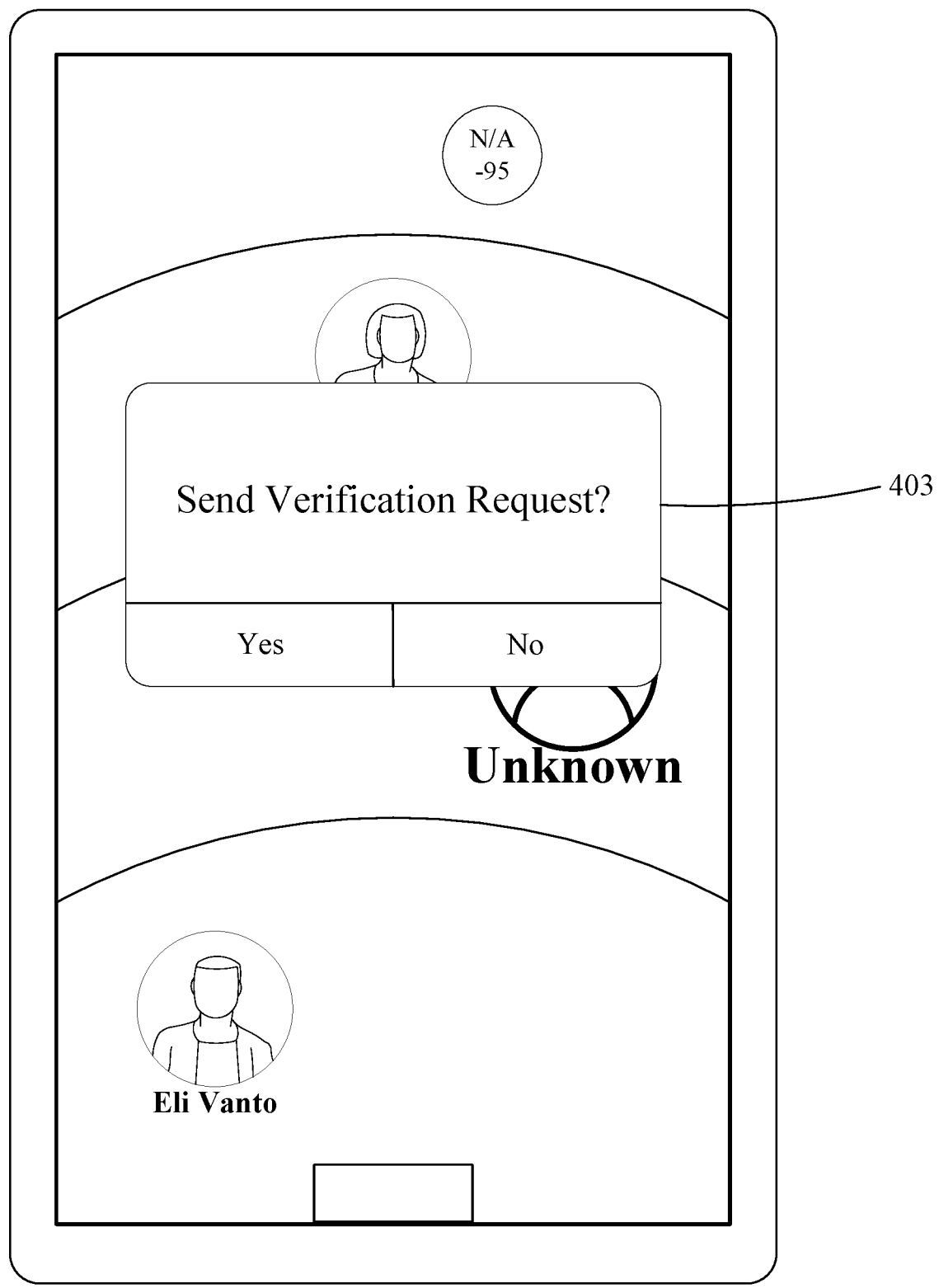
FIG. 4 is an example of a verification service executed by a security device according to examples of the disclosure.

Referring next to FIG. 4, shown is an example of the verification service 148 executed by the security device 109. In this example, the security device 109 displays a prompt 403 that allows security personnel to send a verification request to a client device 106. The verification service 148 can display the prompt 403 after receiving a request for profile information about a user from the ranging application 145. In some implementations, the ranging application 145 can request the profile information from the verification service 148 following a user interaction with the unknown user icon 209 on the map interface 200. Once the verification service 148 receives that request from the ranging application 145, the verification service 148 can determine that no user credential is present in the corresponding user record 154 and display the prompt 403. The prompt 403 displays the text "Send Verification Request?" and includes two selectable components labeled "Yes" and "No." If the security personnel or other user selects the selectable component labeled "Yes," the verification service 148 can provide a verification request to the client device 106 associated with the unknown user icon 209. If the security personnel or other user selects the selectable component labeled "No," the verification service 148 can close the prompt 403.

Figure 5:
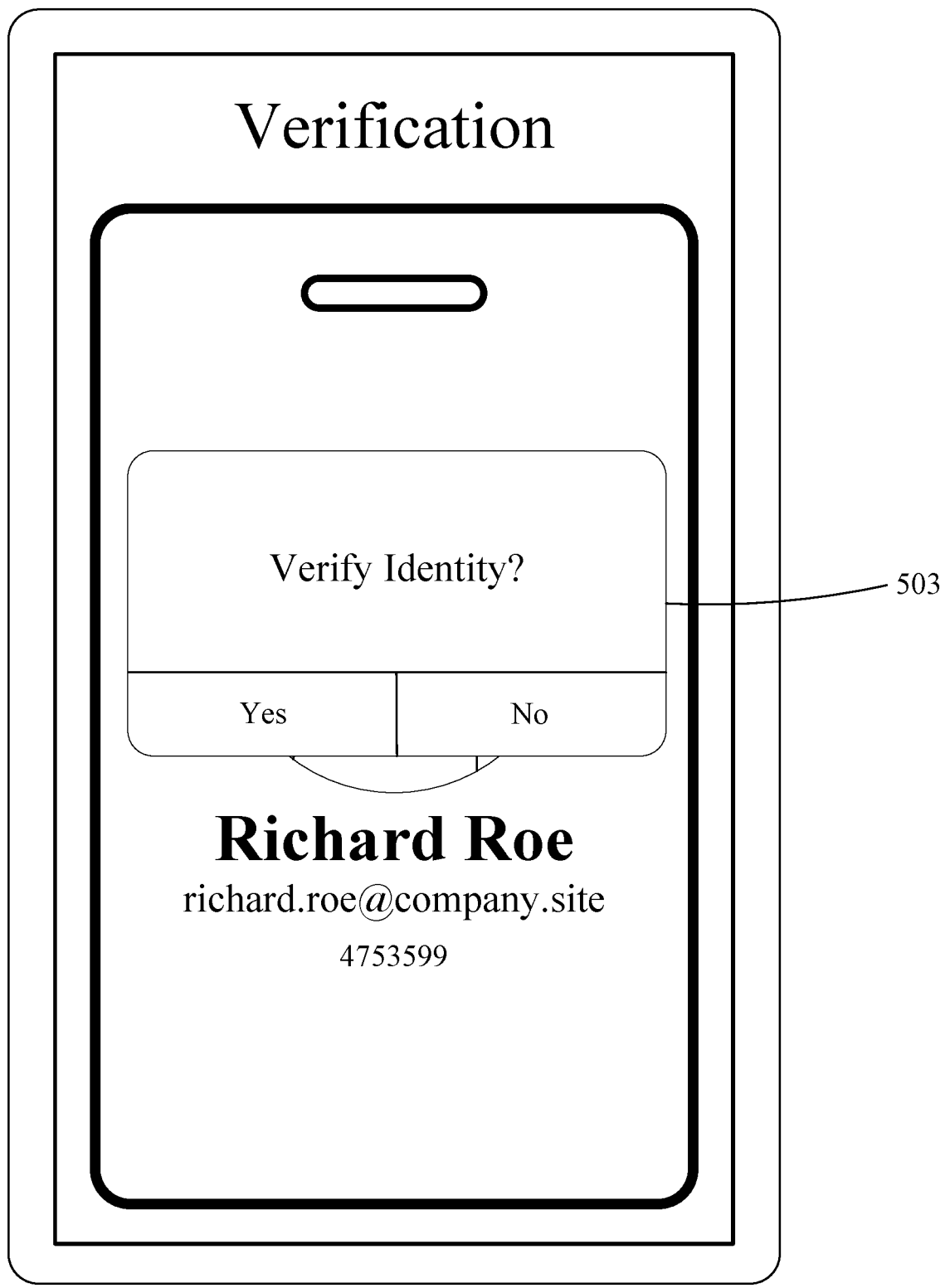
FIG. 5 is an example of a verification application executed by a client device according to examples of the disclosure.

Referring next to FIG. 5, shown is an example of a verification application 143 executed by the client device 106 that can communicate with the security device 109. In this example, the verification application displays a prompt 503 that can allow a user of the client device 106 to accept or decline a verification request received from the security device 109. The prompt 503 displays the text "Verify Identity?" and includes two selectable components labeled "Yes" and "No."

If a user of the client device 106 selects the selectable component labeled "Yes," the verification application 143 can invoke a verification method specified in the verification request using Application programming interfaces provided by the manufacturer of the client device 106, if applicable, and allow the user to perform the verification method. Once the user performs the verification method, the verification application 143 can generate an identity token using output data returned from the verification method. The verification application 143 can then provide the identity token and a user credential to the security device 109. But if the client device 106 does not support the verification method specified in the verification request, the verification application 143 can instead display a prompt or other user interface element that instructs the user to proceed to the verification terminal 112.

If the user of the client device 106 selects the selectable component labeled "No" or if the verification request times out, the verification application 143 can close the prompt 503. In some implementations, the verification application 143 can provide to the security device 109 an indication that the verification request has not been accepted. And in some implementations, the verification application 143 can then cause the client device 106 to display a user interface element that instructs the user to proceed to the verification terminal 112. In other implementations, the verification application can take no further action.

Figure 6:
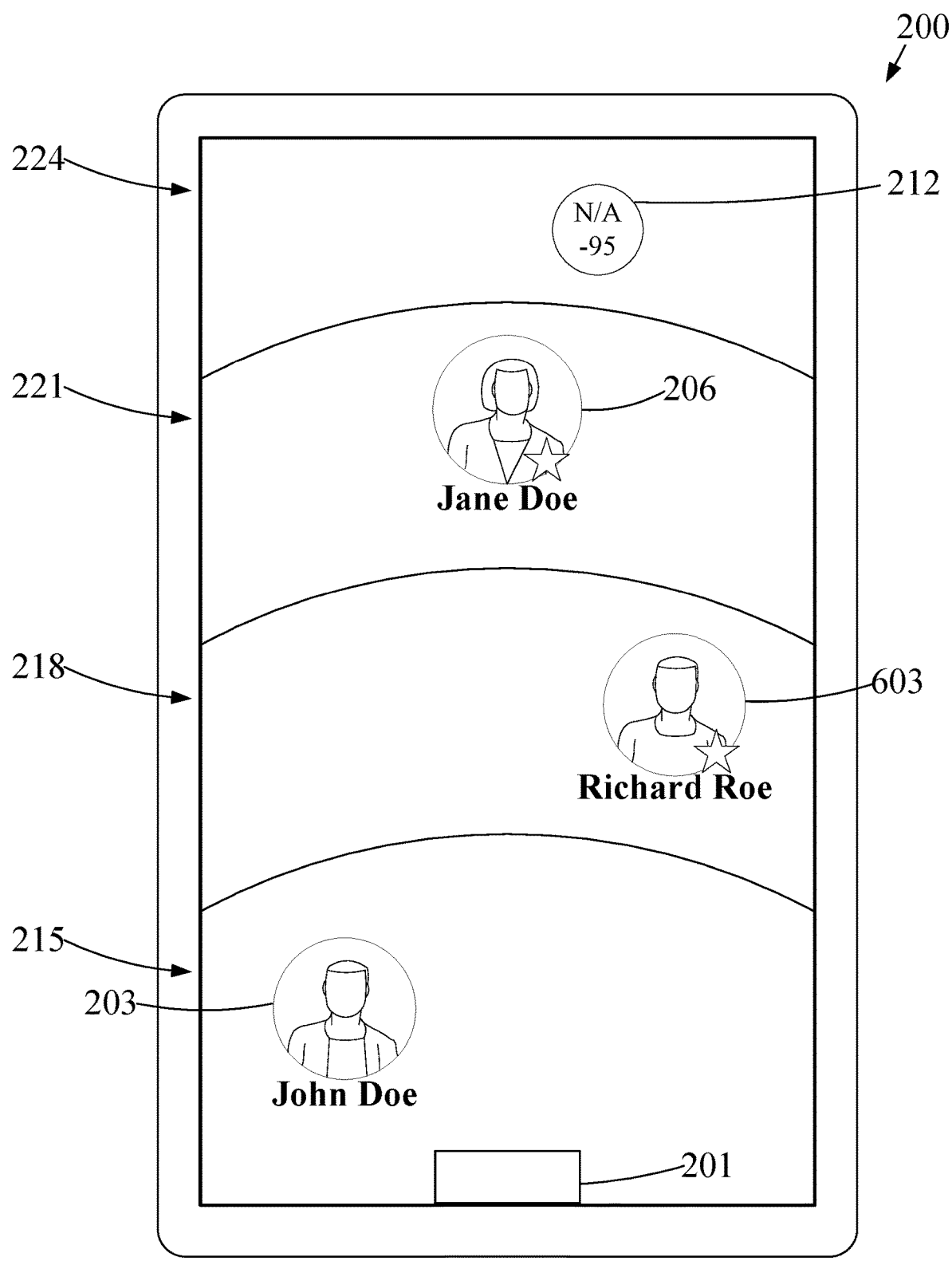
FIG. 6 is an example of a ranging application executed by a security device according to examples of the disclosure FIG. 7 a flowchart that illustrates functionality according to examples of the disclosure.

Referring next to FIG. 6, shown is an example of a ranging application 145 executed by the security device 109. In this example, the ranging application 145 cause the client device 106 to display the map interface 200 including the known user icon 203, the verified user icon 206, and the unassociated user icon 212. But unlike the example of FIG. 2, the map interface 200 includes a second verified user icon 603 instead of the unknown user icon 209. The second verified user icon 603 is displayed after the verification service 148 returns profile information for the user associated with the verified user icon 603 to the ranging application 145. Upon receiving the profile information, the ranging application 145 can update the unknown user icon 206 using the associated user's name and identification image from the profile information to generate the verified user icon 603. The ranging application 145 can also include in the verified user icon 603 and an indication that the associated user's identity has been verified.

Figure 7:
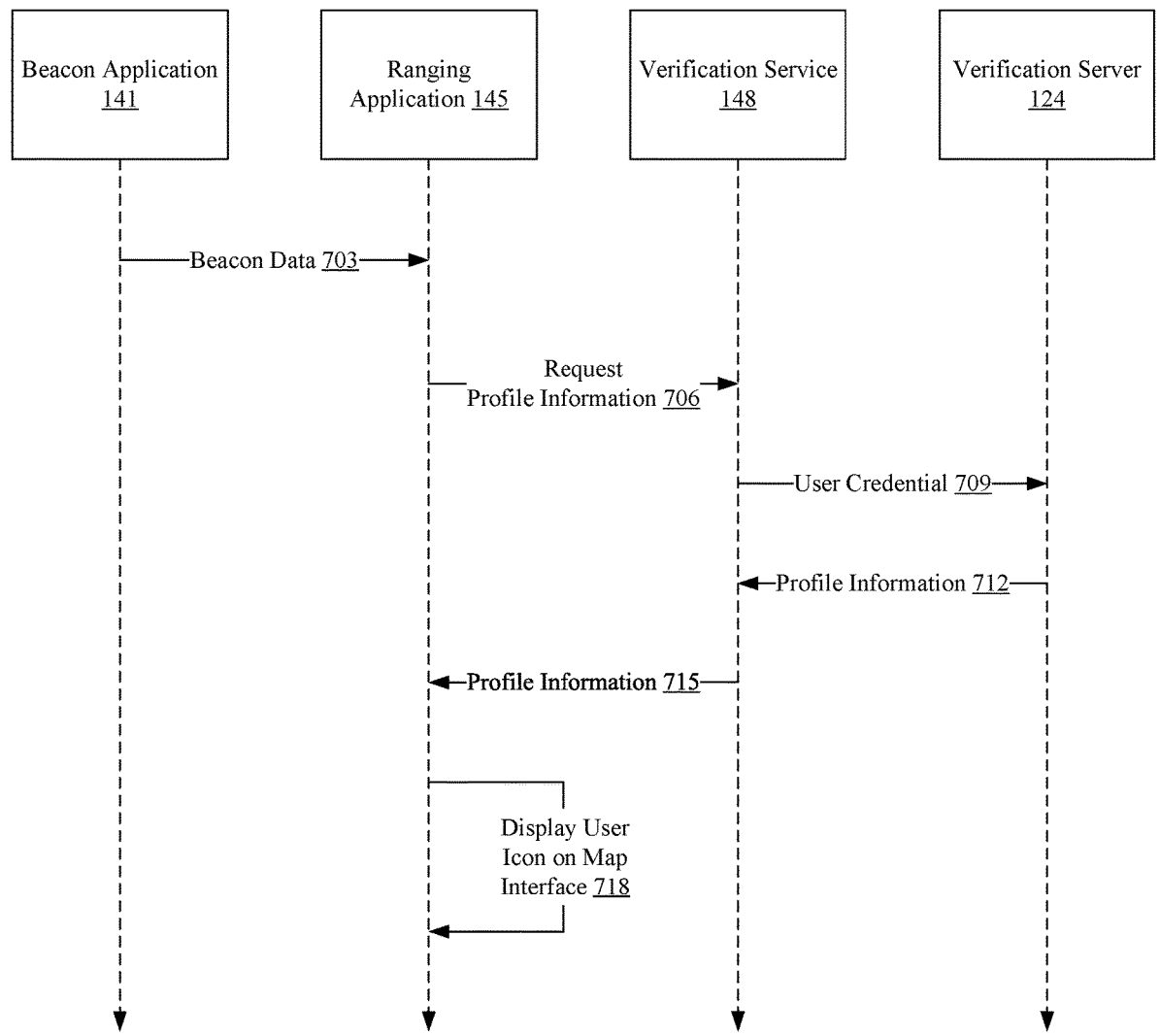

Referring next to FIG. 7, shown is a sequence diagram that provides one example of automatic verification of a user's identity. FIG. 7 assumes that the user's identity has not been verified by the security device 109 or the verification terminal 112 and that automatic verification is enabled on the client device 106.

At step 703, the beacon application 141 can cause the client device to broadcast beacon data 142 to the security device 109. The beacon data 142 can be broadcast using Bluetooth Low Energy, Bluetooth, near-field communication, radio-frequency identification, or other wireless or wired communication protocols supported by the client device 106 and the security device 109. In some cases, communication between the beacon application 141 and the ranging application 145 can be established once the signal strength of a connection between the two reaches a minimum threshold. This threshold can be configured by a user or an administrator. The beacon data 142 can include an enterprise identifier and a user credential field. Because automatic verification is enabled on the client device 106, the beacon application 141 can include a user credential in the user credential field. In some implementations, the beacon application 141 can include in the beacon data 142 an encrypted version of the user credential that is encrypted using a public key corresponding to a private key held by the security device 109.

At step 706, once the security device 109 receives the beacon data 142, the ranging application 145 can provide a user credential from the beacon data 142 to the verification service 148. If the user credential is encrypted, the verification server 124 can first decrypt the user credential using a private key corresponding to the public key with which the user credential was encrypted.

At step 709, the verification service 148 can query the verification server 124 with the user credential over the network 115. The verification server 124 can access the profile information in the user identity data 133 using the user credential.

At step 712, the verification server 124 can provide the user's profile information from the user identity data 133 to the user to the verification service 148. Then, at step 715, once the verification service 148 receives the profile information from the verification server 124, the verification service 148 can provide the profile information to the ranging application 145.

At step 718, the ranging application 145 can display a user icon on a map interface 200 in a display accessible to the security device 109. The user icon can include, for example, the user's name and identification image from the profile information. Where on the map interface 200 the user icon is displayed can be based on the strength of the signal by which the client device 106 that broadcast the beacon data 142. The signal strength can be used to estimate the client device's 106 proximity to the security device 109, and the client device 106 can be included in one of the proximity zones 215-224 based on this estimated proximity. Thereafter, the process can proceed to completion.

Figure 8:
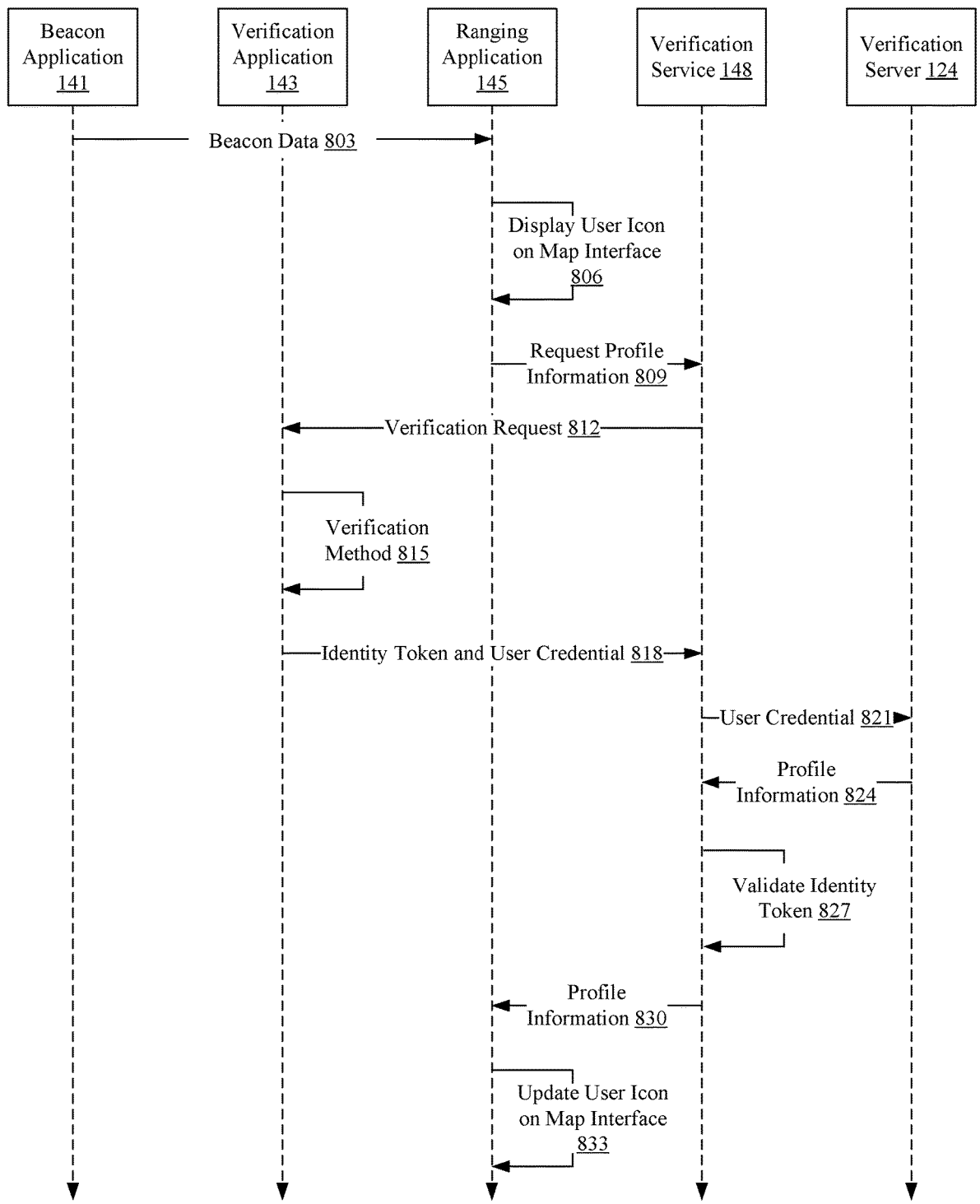
FIG. 8 is a flowchart that illustrates functionality according to examples of the disclosure.

Referring next to FIG. 8, shown is a sequence diagram that provides one example of a process for verifying the identity of a user when automatic verification is not enabled on the client device 106. FIG. 8 assumes that the user's identity has not been verified by the security device 109 or the verification terminal 112 and that that automatic verification is not enabled on the client device 106.

At step 803, the beacon application 141 can cause the client device 106 to broadcast beacon data 142 to the security device 109. The beacon data 142 can be broadcast using Bluetooth Low Energy, Bluetooth, near-field communication, radio-frequency identification, or other wireless or wired communication protocols supported by the client device 106 and the security device 109. In some cases, communication between the beacon application 141 and the ranging application 145 can be established once the signal strength of a connection between the two reaches a minimum threshold. This threshold can be configured by a user or an administrator. The beacon data 142 can include an enterprise identifier and a user credential field. Because automatic verification is not enabled on the client device 106, the beacon application 141 can include a placeholder value or no value at all in the user credential field.

At step 806, once the ranging application 145 receives the beacon data 142, the ranging application 145 can display a user icon on the map interface 200 in a display accessible to the security device 109. Because the beacon data 142 did not include a user credential, the user icon can include a placeholder like "Unknown" instead of the user's name and a default image instead of the user's identification image. Where on the map interface 200 the user icon is displayed can be based on the strength of the signal by which the client device 106 that broadcast the beacon data 142. The signal strength can be used to estimate the client device's 106 proximity to the security device 109, and the client device 106 can be included in one of the proximity zones 215-224 based on this estimated proximity.

At step 809, the ranging application 145 can request profile information for the user from the verification service 148. The ranging application 145 can make this request in response to, for example, receiving an input corresponding to the user icon on the map interface 200.

At step 812, the verification service 148 can provide a verification request to the verification application 143 executing on the client device 106 using Bluetooth Low Energy, Bluetooth, near-field communication, or other wireless or wired communication protocols supported by the client device 106 and the security device 109. The verification service 148 can provide the verification request once the verification service 148 determines that no user credential is available in the user record 154 associated with the user. The verification application 143 can cause the client device 106 to present a visual indication of the verification request that allows the user to accept or decline the verification request. For example, the verification application 143 can display a prompt or other use interface element in a display accessible to the client device 106 that allows the user to accept or deny the verification request.

At step 815, assuming that the user has accepted the verification request, the verification application 143 can cause the client device 106 to invoke the verification method using Application programming interfaces provided by the manufacturer of the client device 106. The client device 106 can return output data from the verification method to the verification application 143. The output data can include one or more Boolean values that indicate the success or failure of the user's performance of the verification method, biometric authentication data collected from the user by the client device 106, or any other data generated or collected by the client device 106 as a result of the user's performance of the verification method. In some implementations, the verification application can also cause automatic verification to be enabled on the client device 106 when the user accepts the verification request.

At step 818, the verification application 143 can generate an identity token based on the output data and provide the identity token and a user credential to the verification service 148. The user credential can be, for example, a badge credential, a random string, or a one-time passcode that identifies the user. The identity token can include the output data from the verification method. In some implementations, the verification application can use a public key to encrypt the identity token, the user credential, or both. The identity token and user credential can be provided to the verification service 148 using Bluetooth Low Energy, Bluetooth, near-field communication, radio-frequency identification, or other wireless or wired communication protocols supported by the client device 106 and the security device 109.

At step 821, once the verification service 148 receives the identity token, the verification service 148 can query the verification server 124 over the network 115 with the user credential provided by the verification application 143. In some implementations, if the user credential was provided by the verification application 143 in an encrypted form, the verification service 148 can decrypt the user credential using a private key corresponding to a public key that was used to encrypt the user credential. In other implementations, the verification service 148 can provide the user credential to the verification server 124 in an encrypted form.

At step 824 the verification server 124 can provide the user's profile information to the verification service 148. If the use credential is in an encrypted form, the verification server 124 can first decrypt the user credential using a private key corresponding to a public key that was used to encrypt the user credential. The verification server 124 can access the profile information in the user identity data 133 using the user credential. The profile information can include information about the user like the user's name, identification image, and badge credential. In some implementations, the profile information can also include the user's biometric data or other data identifying the user that can be used to validate the identity token.

At step 827, once the verification service 148 receives the profile information from the verification server 124, the verification service 148 can validate the identity token. In some implementations the verification service 148 can determine whether the identity token indicates that the verification method was successful. In other implementations, the verification service 148 can determine whether the output data included in the identity token matches the profile information received from the verification server 124. For example, the verification service 148 can check biometric authentication data returned from the verification method against biometric data and included with the profile information received from the verification server 124. If the identity token was received from the verification application 143 in an encrypted form, the verification service 148 can first decrypt the identity token using a private key corresponding to a public key that was used to encrypt the identity token.

At step 830, once the verification service 148 validates the identity token, the verification service 148 can provide the profile information to the ranging application 145. In some implementations, the verification service 148 can provide only the profile information that the ranging application 145 can use to create a user icon to display on the map interface 200.

At step 833, the ranging application 145 can update the user icon displayed on the map interface 200 to include the profile information. The user icon can include, for example, the user's name and identification image from the profile information. Thereafter, the process can proceed to completion.

Figure 9:
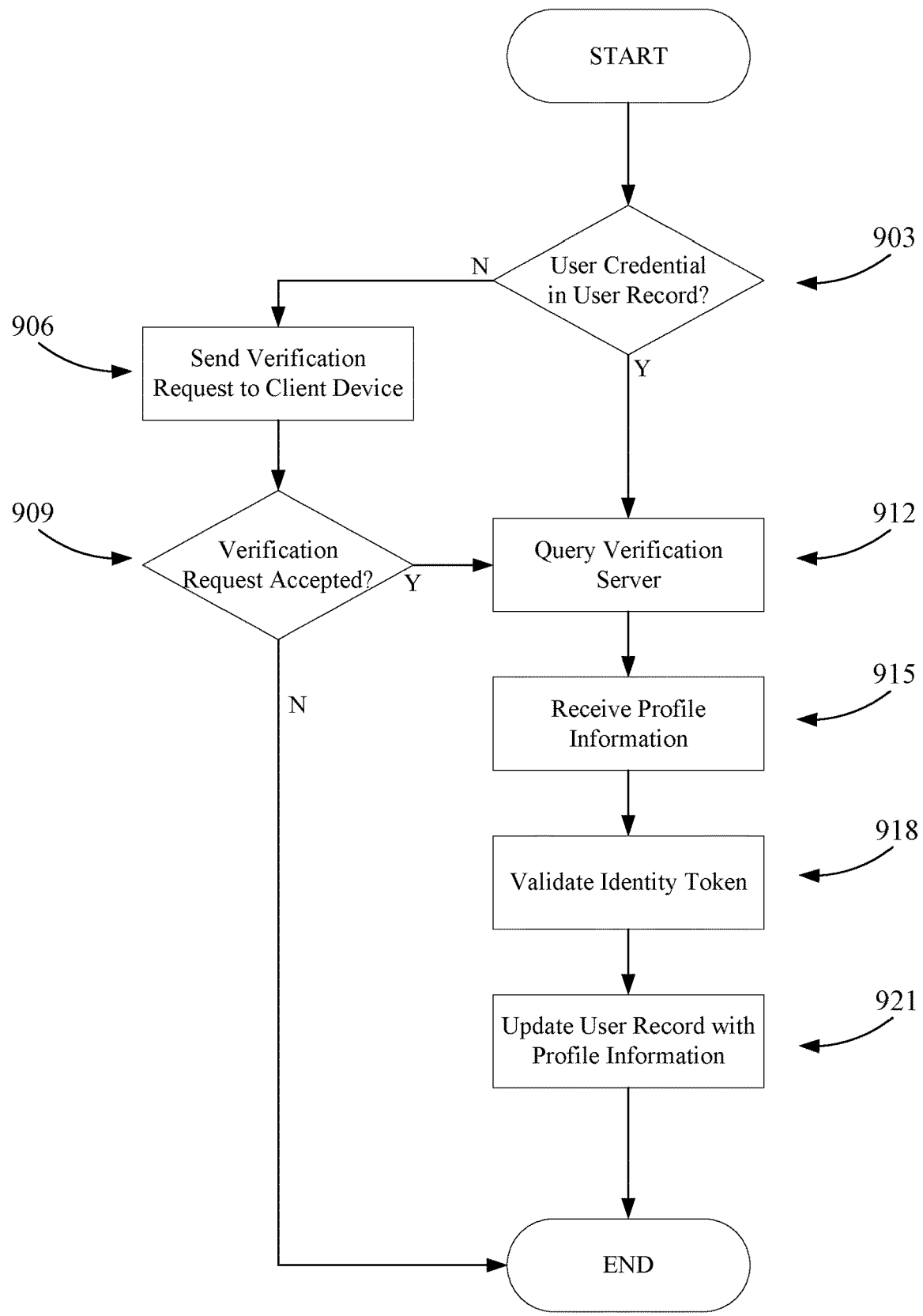
FIG. 9 is a flowchart that illustrates functionality according to examples of the disclosure.

Referring next to FIG. 9, shown is a flowchart that provides one example of the operation of a portion of the verification service 148 to verify the identities of the users of client devices 106 detected by the ranging application 145. The flowchart of FIG. 9 can be viewed as depicting an example of elements of a method implemented by the verification service 148 or other suitable software component according to one or more examples. The separation or segmentation of functionality as discussed herein is presented for illustrative purposes only.

At step 903, the verification service 148 can determine whether the user record 154 associated with a user includes a user credential. If the user record 154 does not include a user credential, the process can proceed to step 906. If the user record 154 does include a user credential, the process can proceed to step 912.

At step 906, the verification service 148 can provide a verification request to the verification application 143 executing on the client device 106. The verification request can be provided to the verification application 143 using Bluetooth Low Energy, Bluetooth, near-field communication, or other wireless or wired communication protocols supported by the client device 106 and the security device 109. According to the policy data 136, the verification request can indicate a verification method that the user should perform to facilitate verification of the user's identity At step 909, the verification service 148 can determine whether the user has accepted the verification request. If the verification service 148 receives from the client device 106 an identity token and a user credential, the user has accepted the verification request, and the process can proceed to step 912. If the verification service 148 receives an indication that the verification request has not been accepted or if the verification request times out, the process can proceed to completion.

At step 912, the verification service 148 can query the verification server 124 with the user credential over the network 115. At step 915, the verification service 148 can receive profile information for the user from the verification server 124. At step 918, the verification service 148 can validate the identity token that was received from the client device 106. The verification service 148 can validate the identity token by, for example, determining whether output data included in the identity token indicates that the verification method was successful, or determining whether the output data included in the identity token matches the profile information received from the verification server 124.

At step 921, the verification service 148 can store the profile information in the corresponding user record 154. In some implementations, the verification service 148 can provide the profile information to the ranging application 145 instead of or in addition to storing the profile information in the user record 154. Thereafter, the process can proceed to completion.

The sequence diagrams of FIGS. 7 and 8 and the flowchart of FIG. 9 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 7 and 8 and the flowchart of FIG. 9 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The enterprise computing environment 103, client device 106, security device 109, verification terminal 112, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 121 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system comprising:
   a computing device comprising a processor and a memory; and
   a memory comprising program instructions, wherein the program instructions, when executed by the processor, cause the computing device to at least:
      receive beacon data from a client device associated with a user account, the beacon data comprising an enterprise identifier and a user credential field;
      determine whether the enterprise identifier corresponds to a particular enterprise that is associated with the computing device, the particular enterprise providing access to a physical resource;
      in response to determining that the enterprise identifier corresponds to the particular enterprise, determine whether the user credential field includes a user credential associated with the user account;
      provide the user credential to a verification server; and
      receive profile information corresponding to the user account from the verification server.

2. The system of claim 1, wherein the program instructions further cause the computing device to at least:
   in response to determining that the user credential field fails to include the user credential, send a verification request to the client device, the verification request specifying a verification method selected based at least in part on policy data stored in a data store accessible to the computing device.

3. The system of claim 2, wherein the program instructions further cause the computing device to at least:
   receive an identity token and the user credential from the client device; and
   validate the identity token based at least in part on the profile information corresponding to the user account.

4. The system of claim 3, wherein the identity token comprises biometric authentication data, and the program instructions that cause the computing device to validate the identity token based at least in part on the profile information corresponding to the user account further cause the computing device to at least:
   determine that the biometric authentication data matches biometric data included in the profile information corresponding to the user account.

5. The system of claim 1, wherein the program instructions further cause the computing device to at least:
   in response to determining that the user credential field includes the user credential, display a user icon in a display accessible to the computing device, wherein user icon includes at least a portion of the profile information.

6. The system of claim 1, wherein the beacon data is received using a Bluetooth Low Energy connection.

7. The system of claim 1, wherein the program instructions further cause the computing device to at least decrypt the user credential using a private key corresponding to a public key used by the client device to encrypt the user credential.

8. The system of claim 1, wherein the user credential comprises a badge credential.

9. A method comprising:
   receiving, by a computing device, beacon data from a client device associated with a user account, the beacon data comprising an enterprise identifier and a user credential field;
   determining, by the computing device, whether the enterprise identifier corresponds to a particular enterprise that is associated with the computing device, the particular enterprise providing access to a physical resource;

in response to determining that the enterprise identifier corresponds to the particular enterprise, determining, by the computing device, whether the user credential field includes a user credential associated with the user account;

providing, by the computing device, the user credential to a verification server; and receiving, by the computing device, profile information corresponding to the user account from the verification server.

10. The method of claim 9, further comprising:

in response to determining that the user credential field fails to include the user credential, sending a verification request to the client device, the verification request specifying a verification method selected based at least in part on policy data stored in a data store.

11. The method of claim 10, further comprising:

receiving an identity token and the user credential from the client device; and validating the identity token based at least in part on the profile information corresponding to the user account.

12. The method of claim 11, wherein the identity token comprises biometric authentication data, and validating the identity token based at least in part on the profile information corresponding to the user account comprises:

determining that the biometric authentication data matches biometric data included in the profile information corresponding to the user account.

13. The method of claim 9, further comprising:

in response to determining that the user credential field includes the user credential, displaying a user icon in a display, wherein user icon includes at least a portion of the profile information.

14. The method of claim 9, wherein the beacon data is received using near-field communication.

15. The method of claim 9, wherein the user credential comprises a single-use passcode or a random string.

16. A non-transitory computer-readable medium comprising machine-readable instructions, wherein when executed by a processor of at least one computing device, the machine-readable instructions cause the at least one computing device to at least:

receive beacon data from a client device associated with a user account, the beacon data comprising an enterprise identifier and a user credential field;

determine whether the enterprise identifier corresponds to a particular enterprise that is associated with the at least one computing device, the particular enterprise providing access to a physical resource;

in response to determining that the enterprise identifier corresponds to the particular enterprise, determine whether the user credential field includes a user credential associated with the user account;

provide the user credential to a verification server; and receive profile information corresponding to the user account from the verification server.

17. The non-transitory computer-readable medium of claim 16, wherein the machine-readable instructions further cause the at least one computing device to at least:

in response to determining that the user credential field fails to include the user credential, send a verification request to the client device, the verification request specifying a verification method selected based at least in part on policy data stored in a data store accessible to the at least one computing device.

18. The non-transitory computer-readable medium of claim 17, wherein the machine-readable instructions further cause the at least one computing device to at least:

receive an identity token and the user credential from the client device; and validate the identity token based at least in part on the profile information corresponding to the user account.

19. The non-transitory computer-readable medium of claim 18, wherein the identity token comprises biometric authentication data, and the machine-readable instructions that cause the at least one computing device to validate the identity token based at least in part on the profile information corresponding to the user account further cause the at least one computing device to at least:

determine that the biometric authentication data matches biometric data included in the profile information corresponding to the user.

20. The non-transitory computer-readable medium of claim 16, wherein the machine-readable instructions further cause the at least one computing device to at least:

in response to determining that the user credential field includes the user credential, display a user icon in a display accessible to the at least one computing device, wherein user icon includes at least a portion of the profile information.

\* \* \* \* \*